May 18, 1954 R. HIGONNET 2,678,712

JUSTIFYING DEVICE

Filed Sept. 1, 1951 4 Sheets-Sheet 1

INVENTOR.
RENÉ HIGONNET
BY Kenway, Jenney, Witter & Hildreth
ATTORNEYS

May 18, 1954 R. HIGONNET 2,678,712

JUSTIFYING DEVICE

Filed Sept. 1, 1951 4 Sheets-Sheet 2

INVENTOR.
RENÉ HIGONNET
BY Kenway Jenney Witter & Hildreth
ATTORNEYS

May 18, 1954 R. HIGONNET 2,678,712

JUSTIFYING DEVICE

Filed Sept. 1, 1951 4 Sheets-Sheet 3

INVENTOR.
RENÉ HIGONNET
BY Kenway Jenney Witter & Hildreth
ATTORNEYS

May 18, 1954 R. HIGONNET 2,678,712

JUSTIFYING DEVICE

Filed Sept. 1, 1951 4 Sheets-Sheet 4

INVENTOR.
RENÉ HIGONNET
BY Kenway Jenney Witter & Hildreth
ATTORNEYS

Patented May 18, 1954

2,678,712

UNITED STATES PATENT OFFICE 2,678,712

JUSTIFYING DEVICE

Rene Higonnet, Cambridge, Mass., assignor to Graphic Arts Research Foundation, Inc., Cambridge, Mass., a corporation of Delaware Application September 1, 1951, Serial No. 244,841

Claims priority, application France October 6, 1945

7 Claims. (Cl. 197—84)

Figure 1:
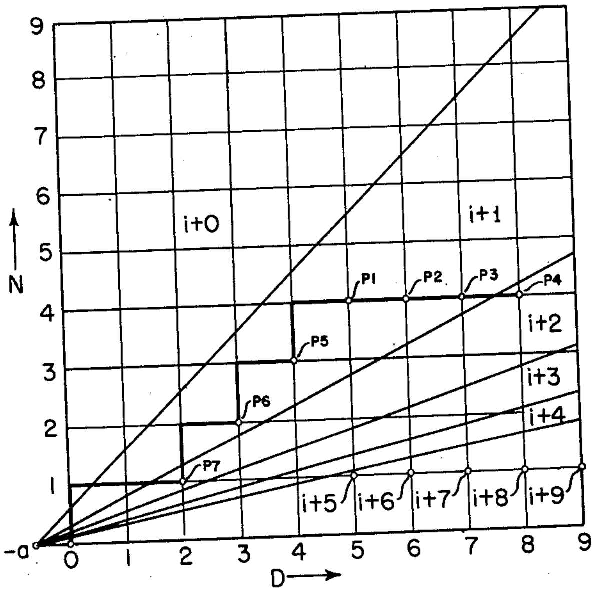

The present invention relates to a method and apparatus for producing justified lines of written matter, and more particularly concerns the justification of printed lines by apparatus suitable for use in conjunction with type composing machines. This application is a continuation-in-part of my copending application Serial No. 700,937, filed October 3, 1946 and now abandoned, and involves improvements in the apparatus disclosed in the application of Higonnet and Moyroud filed on even date herewith as a continuation-in-part of a prior application, Serial No. 610,336, filed August 11, 1945.

The final object of justification is to produce successive lines of characters of the same length, despite the varying content of the respective lines. Numerous methods for doing this are known and used; they involve varying degrees of complexity and bulk of equipment, and also may be distinguished from one another according to the differences in the arrangement and spacing of the characters which are brought about by the justification. In order to place the present invention in its proper relation to the art, a nomenclature which is to be used is first defined.

I refer to the desired length of the justified line as "justified line length," or as the symbol "J." Similarly, the length of the unjustified line (represented by the sum of the assigned widths of each of the characters selected for the line, plus an arbitrarily-assigned minimum space between words) is referred to as "unjustified line length," or as "L." The difference between J and L is the "line deficit," or simply "D." The number of spaces between words in the line, also called "word spaces" or "interwords" is represented by "N," and this is always one less than the actual number of words themselves. Justification can be brought about in several ways, depending upon how the line deficit D is subdivided and distributed as increments of space in the line. One method is to divide D among the interwords only; this is called "interword justification." Another method is to divide D among the total number of characters and interwords counting each character and interword as a unit; this is called "intercharacter justification." A third method is a combination of the first two, and is called "mixed justification."

One of the known justifying methods is simply to divide D by N and to produce in a mechanical element a displacement representing the quotient. If only a limited number of increment sizes are available for selection, then since the quotient $D/N$ is seldom likely to equal exactly any one of the available increment sizes, the resulting lines cannot all be of exactly the justified line length J. It is necessary to distort the type or to provide a large enough selection of increment sizes so that the discrepancies in the margins will not be objectionably large.

In linotype machines, in contrast to the foregoing, the method is to force a number of wedges between the words, or in some cases between characters, until the cast line exactly fills the space between two fixed abutments separated by the length J. This method may be varied for the purposes of photographic type composing by setting up a line or blocks or spacing devices having widths corresponding to the respective characters and minimum interwords. In either case, the method involves the setting-up of type or of devices representing type widths using a magazine and distribution apparatus.

Still another method of justification is shown in the patent to Bush, No. 2,379,862. According to this method a digital computing device is employed to determine an increment size closely approximating the exact quotient $D/N$. The increment size thus determined is not used throughout the line (except when $D/N$ happens to be an integer), but is changed at some point so that each line is of the exact length J.

In the above-mentioned copending application an apparatus capable of producing lines of exactly justified line length is described. This apparatus is adapted for use with rigid, distortionless character objectives such as are employed in photographic type composing apparatus, wherein the characters are projected successively upon a photo-sensitive material in accordance with information stored in a coded register or memory device. Such devices are to be contrasted with equipment using a type magazine and distribution apparatus. A feature of the foregoing apparatus is an improved form of justifier having provision, as in the Bush justifier, for changing the justifying increment at some point in each line where the quotient $D/N$ cannot be provided exactly by a single one of the available increment sizes, but using a system of pre-selection which obviates the performance of any mathematical computation.

A feature of the present invention is the improvement in the justifier described in the copending application whereby the principle of pre-selection, avoiding computation, is applied by use of stepping-switches rather than continuous electrically-conducting areas. This improvement immediately introduces a method for adapting well-known and existing types of equipment to this principle of justification.

Another feature of the invention resides in the procedure whereby the deficit measuring contacts on the stepping switch are caused to move in discrete steps representing character and minimum interword widths during the entire storage period. This makes it unnecessary to use a separate line length counter and means to transfer motion from the line length counter to the deficit measuring contacts to cause them to reach a position representing the deficit for the particular line.

Other features and objects of the invention relate to aspects of the procedure and apparatus employed which will be understood by referring to the drawings and related description to follow.

Figure 2:
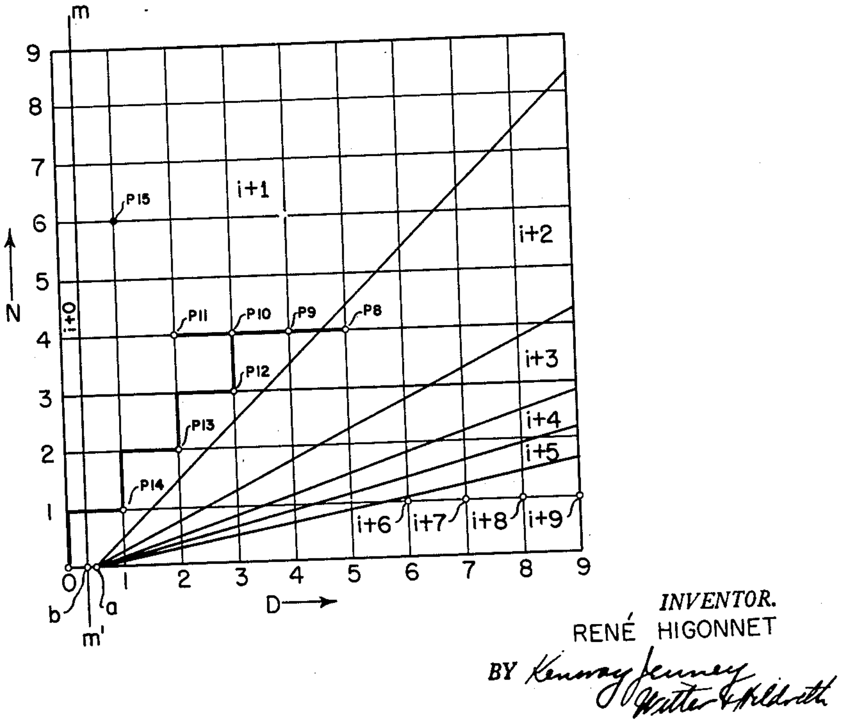
Figure 3:
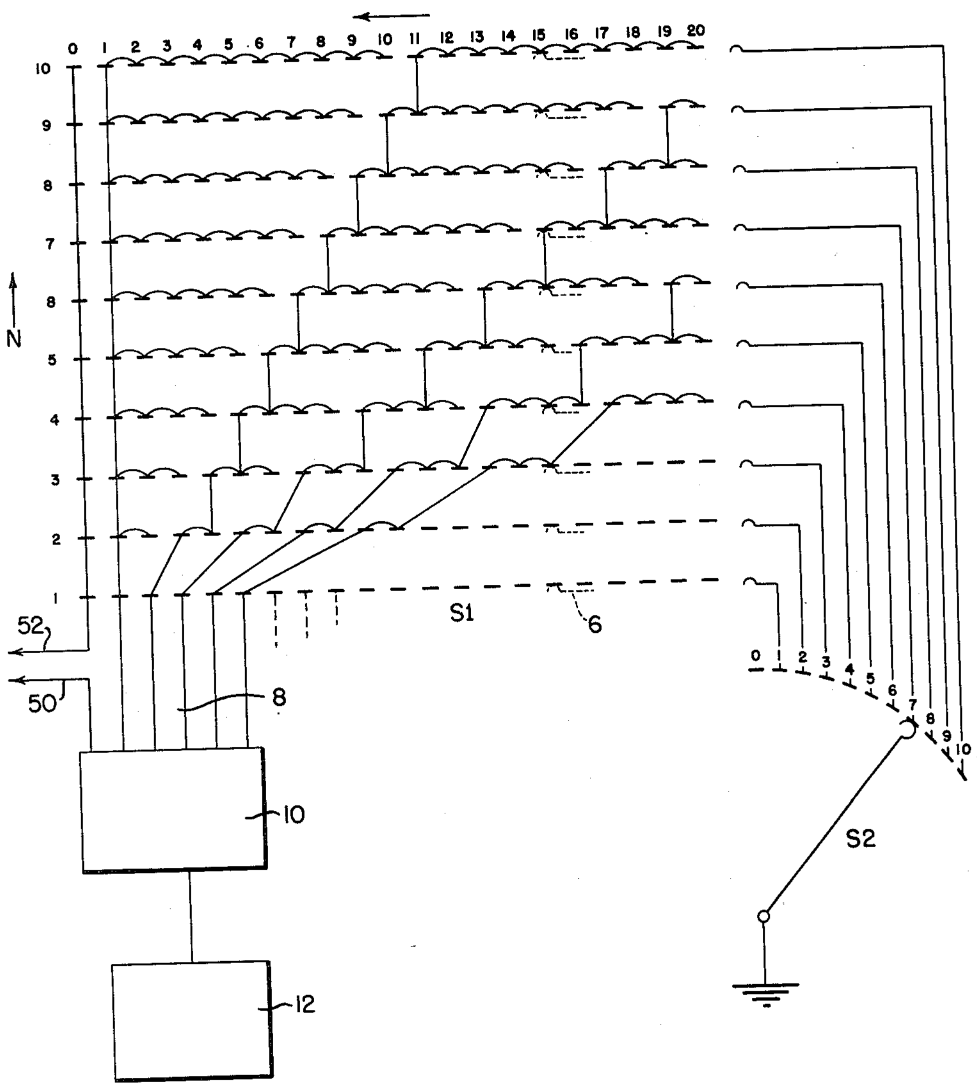
Figure 4:
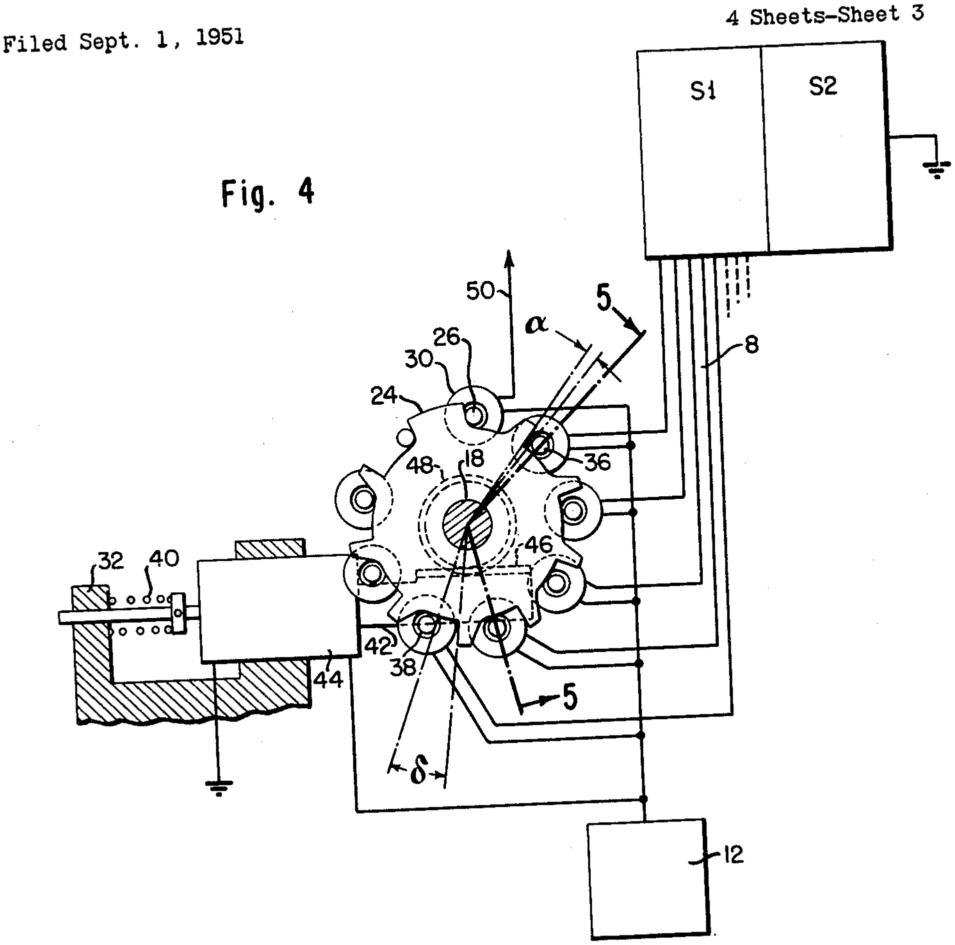
Figure 5:
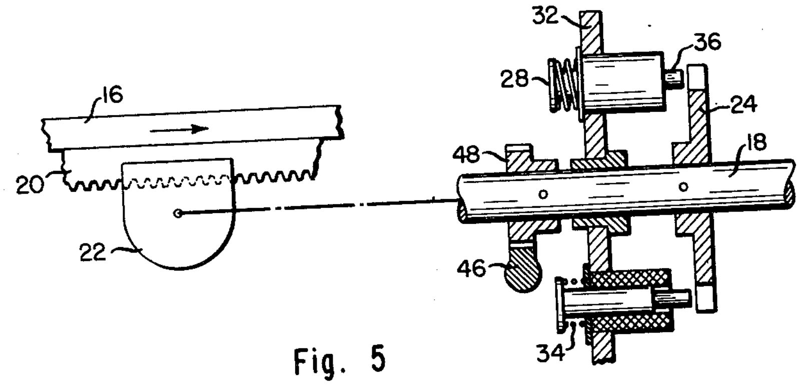
Figure 6:
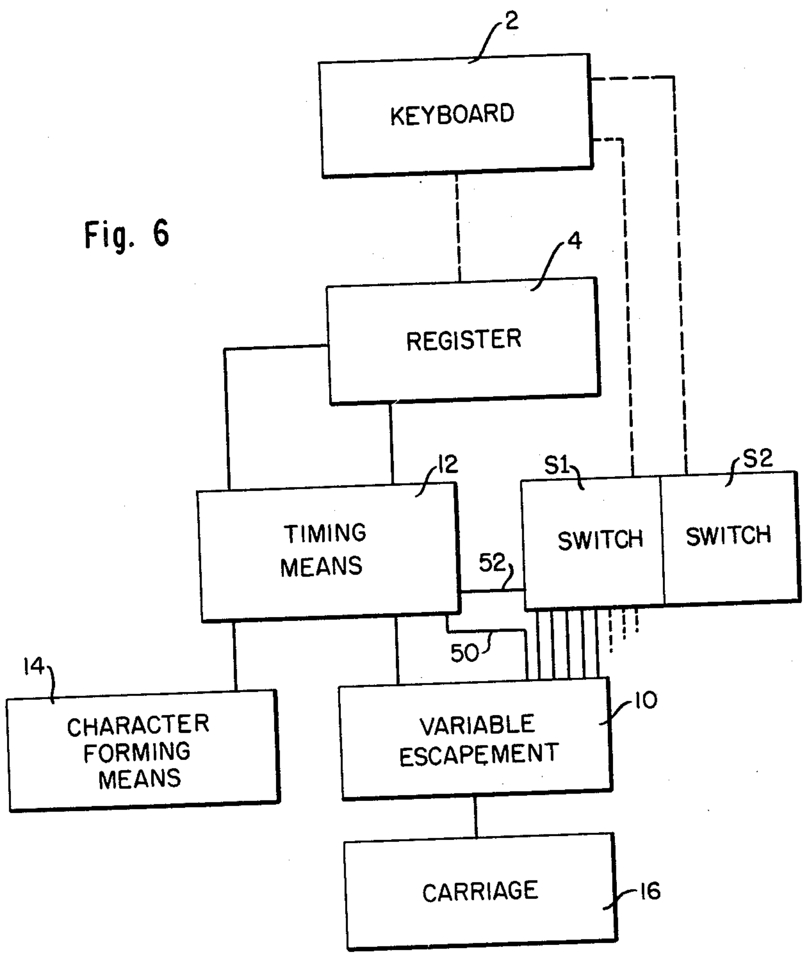

In the drawings, Fig. 1 is a diagram representing the manner in which the justification may be brought about; Fig. 2 is a diagram similar to Fig. 1 showing a variant thereof; Fig. 3 shows an embodiment of the invention using a switch having a cylindrical array of contacts; Fig. 4 is a view partly in section of a variable escapement for spacing the characters and words under the control of the justifier; Fig. 5 is a sectional view of the variable escapement taken along the cutting line 5—5 of Fig. 4; and Fig. 6 is a block diagram of a complete photographic composing machine utilizing the embodiment of Fig. 3.

The principle of operation of the present invention may be shown by reference to Figs. 1 and 2. Fig. 1 shows a field having rectangular coordinates N and D representing, respectively, the number of interwords and units of line deficit. It will be obvious that one may represent by means of such a field a large number of combinations of line deficit and interwords, the number of such combinations being purely a matter of choice.

The field is subdivided into a number of increment areas, or elements, $i+0$, $i+1$, $i+2$, etc., these areas being defined by straight lines such as $N=D+a$, $N=\frac{1}{2}(D+a)$, $N=\frac{1}{3}(D+a)$ etc., where $a$ is a constant of less than one unit, the exact size being immaterial since its function is merely to shift the lines to the left so that none of them intersects a point at which the grid lines intersect each other.

Each of the increment areas, for every point falling within it, defines an interword distance equal to $i$, the minimum interword, plus an additional increment represented by the Arabic numeral following the plus sign. Both $i$ and the increment are measured in multiples of a unitary distance, in which the line deficit D is also measured. Thus, for the point representing $D=6$ units and $N=6$ interwords, the corresponding increment area is $i+1$, defining an interword space of $i+1$ units.

Suppose, now, that a given line has a deficit D of 5 units and has 4 interwords. This is represented by the point P1 in Fig. 1. Suppose also that the first interword space in the line is to be defined by the increment area within which P1 falls. In this case, the first interword will then contain $i+1$ units. It is apparent that if a like space were to be employed for each of the four interwords in the line, the total space consumed by the interwords would be $4(i+1)$ or $4i+4$. It will be remembered that the line deficit D was originally computed in such a way that the resulting 5 units was the excess of J over L, L being the sum of the character widths, plus $4i$. The resulting line would therefore be short of J by one space unit. To avoid this result, either of two procedures may be employed.

According to one procedure, after the first interword is given the value represented by the point P1, the next interword will have a value represented by the point P2, one unit to the right of P1. This will again be $i+1$ units. The third interword, repeating this procedure, will have a value represented by P3, and the fourth interword will have a value represented by P4. The last interword will have the value $i+2$, since the point P4 is in the increment area $i+2$. The total space consumed by the interwords will be $3(i+1)+i+2$, or $4i+5$, and the line will equal J exactly.

According to the other procedure, after the first interword is given the value represented by the point P1, the next interword will have a value represented by the point P5, one space below the point P1, and one unit to the left. The one unit to the left is determined by the fact that the point P1 is in an area having an increment of one unit. In like manner, the third interword is given the value represented by the point P6, one space below the point P5, and one unit to the left, since the point P5 is in the same area having an increment of one unit. The fourth interword is given the value $i+2$, since the point P7, one unit to the left and one space below the point P6, is in the area $i+2$. Thus, this procedure calls for a movement, after each interword space is determined, of one space down, and a movement to the left of as many units as there are increment units in the area containing the point from which the movement begins. It will be noted that, if there were any reason for so doing, a final movement from the point P7 would comprise a movement of two units to the left and one space down, terminating in the origin of the diagram. This procedure results in each of the interwords being given the same value as provided by the first procedure, and the line will again equal J exactly.

Using either of the above-described procedures, it will be apparent that a solution giving rise to an exactly justified line is provided for every combination of line deficit and interwords represented by a point on the diagram. However, it will be apparent that some adjustment must be made for cases where the operation causes a point to be reached which is below the area $i+4$. Since the areas become increasingly narrower it is graphically convenient to encircle such points, as shown in Fig. 1, and to designate such points as $i+5$, $i+6$, etc. These points are treated as defining interword values in the same manner as the areas above.

Fig. 2 is substantially similar to Fig. 1, with certain differences which are stated below. The principal difference is that the lines defining the increment areas are $N=D-a$, $N=\frac{1}{2}(D-a)$, $N=\frac{1}{3}(D-a)$, etc.; that is, the lines are shifted to the right instead of to the left. The increment areas are also given a value one unit higher than in the case of Fig. 1. Thus, although the areas are numbered differently than in Fig. 1, for the point $D=6$ units and $N=6$ interwords the corresponding increment area is $i+1$, or the same as in Fig. 1. Another difference is that a vertical line $mm'$ is drawn $b$ units to the right of the vertical axis of the diagram, thus separating the area $i+1$ from an area $i+0$. The reason for this line is explained below.

As in Fig. 1, two justifying procedures may be employed using Fig. 2. The first is analogous to the first procedure of Fig. 1, except that instead of moving to the right, as from P1 to P2 to P3, etc., the movement is to the left. Thus, starting from an initial position at P8, the movement is to P9, to P10, and finally to P11. The second procedure is exactly the same as the second procedure described in connection with Fig. 1; that is, starting from the initial point P8, the movement is to P12, then to P13, and finally to P14.

Both methods used on this diagram produce an identical result, as in the case of Fig. 1. However, it will be noted that the distribution of the interword spaces will differ from that produced by using Fig. 1. In the case of Fig. 1, if the interword increment changes at some point in the line, the change will consist of an increase in the increment of one unit. In the case of Fig. 2, the change will consist of a decrease in the increment of one unit.

Suppose, in Fig. 2, that $D=1$ unit and $N=6$ interwords. The initial point will then be at P15. It will be apparent that a correct result requires that five interwords shall have the minimum value $i$, and one shall have the value $i+1$. For this reason the line $mm'$ is provided so that, after the first interword is determined by the point P15, the subsequent movements, by either of the two methods, will bring all subsequent points within the increment area $i+0$.

It will be apparent after a consideration of Figs. 1 and 2 that analogous diagrams may be employed in which other coordinate systems, such as polar coordinates, may be used. Also, the scales may be differentially compressed, as by the use of logarithmic scales, provided that the successive movements described above are compressed or expanded in a corresponding manner. The lines separating the respective areas may be stair-stepped or otherwise shaped in any desired manner, provided that the same points are included in the respective areas as indicated by Fig. 1 or 2. It is also clear that the lines separating the respective areas may be eliminated entirely, provided that each point representing the intersection of grid lines is defined as also representing the interword value corresponding to the area within which it would fall if such lines had been included in the diagram.

The particular embodiment of the invention described below is adapted to employ the procedures of justification graphically illustrated with reference to Figs. 1 and 2.

Fig. 3 shows an embodiment of the invention adapted to utilize the first procedure described in connection with Fig. 2. According to this procedure, for the example given above, the successive points which determine the successive interword widths are P8, P9, P10 and P11. The block diagram of Fig. 6 illustrates the manner in which this device may be adapted to the other elements in a photographic composing machine.

As shown in Fig. 6, the machine is provided with a keyboard 2. The keyboard is adapted to actuate a register 4 which is typically constructed in such a manner that it can store the information representing all of the keyboard operations performed for any given line.

In addition, the keyboard actuates two switches S1 and S2, shown also in Fig. 3. The switch S1 is shown in a developed view (Fig. 3). Actually, the rows of contacts shown as horizontal are arranged in circles, the right-end contact of each row being adjacent to the left-end contact of the same row. Thus, the entire array of contacts is cylindrical in shape.

It should be noted that, while it is here assumed that the switch S1 is cylindrical, it will be apparent to those familiar with the telephone art that the equivalent function may be provided by a semicircular array if two brushes in each row, spaced 180 degrees apart, are used in connection with means for switching from one brush to the other at the appropriate positions.

The number of horizontal rows of the switch S1 is equal to the maximum number of interwords in any given line. The number of contacts per row is equal to the maximum number of units of line deficit in any given line. A brush such as 6 is provided for each row, these brushes being mounted rigidly upon a rotating assembly moving from right to left over the contacts, as shown in the developed view.

The switch S2 is a simple rotary switch providing a means for selecting any desired brush such as 6.

At the beginning of the storage of each line the brush of the switch S2 is at its zero position. Each time the space bar is actuated, this brush moves one step in a clockwise direction. Thus, the switch S2 is an interword counter and may be thought of as measuring the equivalent of the N dimension in Fig. 2.

Each time a character key is depressed the brushes of the switch S1 move from right to left over a number of contacts equal to the number of units of width in the particular character. When the space bar is actuated the movement is by the number of units in the minimum interword, which is $i$ units. The mechanism which brings about these movements may be a variable escapement similar to that which is hereinafter described. The switch S1 thus serves as a means for measuring the line deficit and may be thought of as measuring the equivalent of the D dimension in Fig. 2. In order to measure the D dimension, however, it must be assumed that at the beginning of the storage of each line the brushes of this switch are at an initial position such that, after moving over a number of contacts equal to J they will come to rest at the zero position. This movement in the typical case will involve several complete revolutions of the contacts. Thus, if the initial position were 5 (see Fig. 3), the switch S1 will measure D for any line having $J=5+21n$ units of width, where $n$ is any positive integer.

As shown in Fig. 3, the contacts of the switch S1 are connected in groups, or elements, corresponding to the increment areas of Fig. 2. Each such group is electrically connected through a wire such as 8 to a variable advance mechanism, such as a variable escapement 10 (see also Fig. 6) which moves a carriage to space the characters in a manner hereinafter more fully described. By way of illustration of the relationship between these groups of contacts and Fig. 2, the wire 8 represents the field $i+3$.

Immediately upon the final actuation of the keyboard for a given line, and upon the completion of the final movements of the switches S1 and S2 (or simply of the switch S1 alone), the switches S1 and S2 will have located a particular contact on the switch S1 which represents the line deficit and number of interwords for the particular line. This is the contact with which the brush is in contact on the row selected by the switch S2. It will be noted that it is the only contact which closes a circuit from the ground, through a contact on the switch S2, to a particular wire such as 8 leading into the variable escapement 10.

After the storage, the characters are then photographically transcribed from the register, one at a time, and spaced under the control of the register and the switches S1 and S2. This process is carried out under the control of timing means, designated as 12 in Fig. 6. For the purpose of this description the particular form of this timing means is not important, but by way of example it will be assumed that it is comprised of cam-operated electrical contacts. The timing means is adapted to cause a character forming means 14 to transcribe the selected characters stored in the register 4 onto a surface (in this example, by photographic projection), the surface being mounted on a carriage 16. The carriage 16 is moved under the control of the variable escapement 10.

For each keyboard operation stored in the register the timing means causes the following events to happen in succession during transcription:

First, the stored information is "read" from the register 4 and the appropriate image projected upon a photo-sensitive surface by the character forming means 14. If an interword is registered there will be no projection.

Second, a circuit is completed from the register 4 through the timing means 12 to the variable escapement 10 to cause a movement of the carriage 16 by a number of units corresponding to the width of the character. If an interword is registered the displacement will be equal to the minimum interword *i*.

Third, if an interword is registered, a circuit is completed from the timing means 12, which is assumed to be connected to a source of electrical energy, through the variable escapement 10 and the switch S1, to the switch S2, which is grounded (see also Fig. 3). This causes an additional movement of the escapement equal to the number of units of increment to be added to the interword as indicated by the positions of the switches S1 and S2.

Fourth, if there was a movement in step three, the brush of the switch S1 is moved one step to the left, in accordance with the procedure outlined above with reference to Fig. 2.

Figs. 4 and 5 show in greater detail the construction of the variable escapement or feeding device 10. The carriage 16 is shifted in one direction by rotation of a shaft 18. For this purpose the carriage may be provided with a rack 20 which is driven from the shaft 18 through a one-way clutch device diagrammatically shown at 22 to shift the carriage in response to rotation of the shaft 18 in one direction only. Device 22 may be a well-known ratchet and pawl arrangement connected between the shaft 18 and a pinion driving the rack 20.

Keyed to the shaft 18 is a disk 24 having on its periphery a series of notches of different widths separated by teeth. A number of sliding stops such as 26 cooperate with the disk 24, one stop being provided for each notch. These stops, preferably made of non-magnetic material, are secured to magnetic cores such as 28 which are electro-magnetically controlled by electromagnets such as 30, secured to a fixed frame 32. As shown in Fig. 4, each of these electromagnets is connected to a source of electrical potential in the timing means 12 and to one of the wires such as 8 leading into the switch S1. When one of these electromagnets is energized, the corresponding stop projects into the path of the disk 24 against the action of a return spring such as 34. An exception to this is for the electromagnet 36. When this electromagnet is not energized the stop 26 is projected into the path of the disk; and when it is energized the stop 26 is withdrawn.

The stops are so arranged that each one is placed at a different distance from a corresponding tooth. This provides means for selecting from a number of possible angular degrees of clockwise movement. For example, the stop 26, when in immediate contact with a tooth, prevents any clockwise rotation of the disk; a stop 36 provides for an angular displacement alpha; and a stop 38 provides for an angular displacement delta. The stops each provide an angular displacement which is a multiple of a unitary displacement, assumed here to be alpha, this unitary displacement causing a movement of the carriage 16 through the device 22 which is equal to one width unit.

The disk 24 is normally urged in a clockwise direction by a tension spring 40 which is connected to a core 42 of a magnet 44, normally unenergized, the core having a rack 46 engaging a pinion 48. The pinion 48 is keyed to the shaft 18.

When the third step in the transcription process referred to above is to be performed, a source of electrical potential is connected to one lead of each of the electromagnets such as 30. The other lead of only one of the normally disengaged electromagnets will find a circuit to ground through a wire such as 8 and the switch S1, in accordance with the above description; therefore only this stop will be projected into the path of the disk 24. It will be noted that no movement of the disk 24 will result until the magnet 30 is also energized, however. If the switch S1 is assumed not to be in its zero position, this is accomplished by the connection of a lead 50 (see Figs. 3, 4 and 6) to a ground in the timing means 12. If the switch S1 is in its zero position a lead 52 (see Figs. 3 and 6) is grounded through the switch S2, thus providing a signal to the timing device 12 that the lead 50 is not to be grounded. Under these conditions there is no movement of the disk 24.

In the case where the disk 24 has been rotated clockwise by a certain angle it is returned to its original position by the action of the electromagnet 44 which is energized and causes the rack 46 to move toward the right.

It will be recognized that modifications of the embodiment described above may be brought about, such as by shifting the switch through a fixed angle, or by changing direction of movement, which modification would result in a change to one of the other procedures described in connection with Figs. 1 and 2.

It will also be recognized by those skilled in the telephone art that the switch S1, shown as a single cylindrical switch, may be readily replaced with a number of smaller multi-level stepping switches so interconnected as to produce the equivalent effect.

Having thus described my invention, I claim:

1. In a photographic type composing machine in which each typed line is first stored in a storage device and is then printed on a sensitive film from said storage device, a justifying device for controlling the spacing between words during said printing comprising, in combination, a stepping switch operated by the spacer bar during the initial typing of each line to step the switch around to a position corresponding to the number of word spaces in the typed line, a second stepping switch provided with a plurality of rows of contacts each provided with a brush connected to a contact on said first stepping switch, means for stepping said second switch from a predetermined position towards a position of rest representing the maximum length of a printed line, the stepping of said second switch being controlled in accordance with the length units in the line of stored characters, and a variable advance mechanism for advancing the sensitive film during printing, the contacts in each row of said second switch being connected in groups, each group having contacts equal in number to the word spaces corresponding to the row of contacts, means connecting a first group of contacts in each row to produce a predetermined advance of said film for each word space, means connecting the succeeding groups of contacts in each row extending in the direction of said predetermined position from said first group to control said advance mechanism through said first switch to produce increasing amounts of advance for each word space, and means for stepping said second switch one step towards said rest position for each word space during printing.

2. In a justifying device for photographic type composing machines in which additional space is added to word spaces by a variable advance mechanism controlling the displacement of the film carriage, a control circuit for controlling the number of additional length units to be added to the successive word spaces comprising a stepping switch with as many brushes and associated terminal rows as there may be word spaces in the line, said terminals in each row being connected in groups each group comprising as many terminals as there are word spaces in the corresponding line, each group controlling an advance of the variable advance mechanism to move selectively the film carriage after every word space, means operating before the line is printed to move said brushes to a position spaced from the rest position a distance equal to the number of length units in the line remainder, a second stepping switch controlled by the number of word spaces in the line to be printed for selecting among said brushes the one corresponding to the number of word spaces in the line, and means for moving said brushes of said first switch one step towards the rest position after each word space during printing.

3. In a justifying device for a photographic type composing machine in which additional space is added to word spaces by mechanism controlling the displacement of a film carriage after the photographing of each word in a composed line, a first stepping switch operated during the composition of the line to a final position corresponding to the number of word spaces in the line being processed, a plurality of rows of contacts in which each row corresponds to a word space total and each contact in each row corresponds to a number of space units unconsumed in the processing of the line, control connections from groups of interconnected contacts to said mechanism, a second stepping switch having brushes playing over each row of said contacts, each brush being connected to one contact on said first switch, whereby the first switch operates to connect in the brush playing over the row of contacts corresponding to the number of word spaces in the composed line, and means for actuating said second switch to step said brushes progressively along said rows of contacts, whereby during the justifying operation the connected brush sequentially engages contacts energizing said film carriage mechanism, the connected groups of contacts in each row being effective to cause a predetermined advance of the film carriage, and each successive group of contacts in a row being effective to cause a decreasing amount of advance.

4. In apparatus for composing justified lines of written matter, the combination of a keyboard, a register for storing information corresponding to a line of selected characters of different widths and spaces in said written matter, character forming means actuated by the register to transcribe the selected characters successively upon a sheet, spacing mechanism having provision for moving the character forming means relative to said sheet in multiples of a unit distance, spacing controls actuated by the register for causing the mechanism to space the characters according to their widths and minimum interwords, and a justifier for causing incremental movements of said mechanism, comprising stepping switch means having a field of elements oriented with reference to a pair of coordinates, said coordinates respectively representing units of line deficit and number of justification increments, each element being composed of a number of interconnected switch contacts and representing a precomputed increment size corresponding to said coordinates, brush selector means controlled by the keyboard to step toward an ultimate position in said field corresponding to said line, said brush selector means having a circuit for actuating the spacing mechanism according to the element with which the brush selector means is connected for each increment during transcription of the line, and means for stepping the selector means to successive positions in said field during said transcription.

5. In apparatus for composing justified lines of written matter, the combination of a keyboard, a register for storing information corresponding to a line of selected characters of different widths and spaces in said written matter, character forming means actuated by the register to transcribe the selected characters successively upon a sheet, spacing mechanism having provision for moving the character forming means relative to said sheet in multiples of a unit distance, spacing controls actuated by the register for causing the mechanism to space the characters according to their widths and minimum interwords, and a justifier for causing incremental movements of said mechanism, comprising a field of elements arranged with reference to a pair of coordinates, said coordinates respectively representing units of line deficit and number of justification increments and each element representing a precomputed increment size corresponding to said coordinates, selector means movable relative to the field under the control of the keyboard and after each keyboard actuation to select an ultimate position in the field corresponding to said line, said selector means having a circuit for actuating the spacing mechanism according to the element with which the selector means is connected for each increment during transcription of the line, and means for stepping the selector means to successive positions in said field during said transcription.

6. In a composing machine having typing means for storing each line in a register and means for subsequently transcribing the line character-by-character, a justifying device for controlling the spacing between words during transcription comprising a first stepping switch operated by the space bar during storage of the line and having contacts representing the number of stored word spaces, a second stepping switch provided with a number of rows of contacts, each row corresponding to a number of word spaces and each contact corresponding to a value of line deficit, and a brush for each row adapted for movement over said contacts, connections from the brushes to the contacts of the first stepping switch, means for stepping the second switch during storage of the line from a predetermined position toward a position representing the justified line length by amounts corresponding to the widths of the typed characters and minimum interword spaces, a variable advance mechanism operable by the register for spacing the characters during transcription, a circuit connecting the contacts of the second stepping switch in groups, each group being connected to the variable advance mechanism, whereby a selected contact on the second stepping switch completes a circuit from the first stepping switch to the variable advance mechanism, and means operable during transcription of the line to step the second stepping switch to successive contacts corresponding to each increment.

7. In a justifying device for type composing machines in which additional space is added to word spaces in a line by a variable advance mechanism controlling the distance between characters, a justification device for controlling the multiple of a unit length value to be added to each word space comprising a stepping switch with as many brushes and associated terminal rows as there may be word spaces in the line, said terminals in each row being connected in groups, each group corresponding to a predetermined size of justification increment and controlling an advance of the variable advance mechanism to add said additional length units, means operating during storage of the line to move said brushes to a position spaced from a rest position by a distance corresponding to the line deficit, a second stepping switch controlled by the number of word spaces in the line for selecting the brush on the first stepping switch corresponding to the number of word spaces in the line, and means for moving the brushes of the first switch to successive positions corresponding to each increment during transcription of the line, whereby the line is exactly justified.

References Cited in the file of this patent

UNITED STATES PATENTS

| Number | Name | Date |
|---|---|---|
| 2,379,862 | Bush | July 10, 1945 |